3,483,146
CURED AND CURABLE COMPOSITIONS COMPRISING A POLYGLYCIDYL ETHER OF A POLYMERIC FATTY ALCOHOL
Rainer Janssen, Kamen, and Dietrich Helm and Eugen Griebsch, Unna, Germany, assignors to Schering AG., Berlin, Germany
No Drawing. Filed July 13, 1967, Ser. No. 653,021
Claims priority, application Germany, July 14, 1967, Sch 39,259
Int. Cl. C08g 30/02, 30/14
U.S. Cl. 260—2        4 Claims

ABSTRACT OF THE DISCLOSURE

Aliphatic glycidyl ethers of the formula

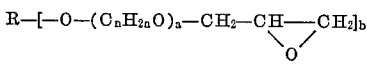

where R is the hydrocarbon radical of a polymeric fatty alcohol and $a=0\text{–}5$, $b=2\text{–}4$, and $n=2$ or $3$, prepared by condensing epichlorohydrin with a polymeric fatty alcohol. Compositions, curable to form flexible resins, comprising said ethers and other epoxy compounds. Flexible resins prepared by curing said ethers, alone or in admixture with other epoxy compounds, with known epoxy-reactive cross-linking agents and catalysts. Said compositions are useful in forming laminates, as coatings, castings, patching materials and adhesives.

---

The present invention relates to certain aliphatic glycidyl ethers, to hardenable compositions containing said ethers, to cured resins obtained by hardening said compositions, and to methods of making said ethers, compositions and cured resins.

The aliphatic glycidyl ethers of the present invention are of the following formula:

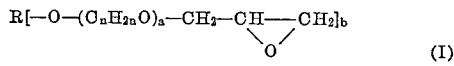   (I)

wherein R is a hydrocarbon radical of a polymeric fatty alcohol, $a$ is 0 to 5, $b$ is 2 to 4, and $n$ is 2 or 3. Glycidyl ethers of this type are prepared by the reaction of epichlorohydrin with polymeric fatty alcohols of the general Formula II.

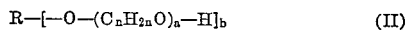   (II)

wherein R, n, a, and b have their earlier meanings.

The polymeric fatty alcohols reacted with epichlorohydrin according to the present invention can be obtained from polyunsaturated fatty alcohols by polymerization in the presence of weak alkalis, optionally in the presence of polymerizable mono-unsaturated alcohols. For example, German patent publication 1,207,371, incorporated herein by reference, teaches polymeric fatty alcohols prepared by polymerizing unsaturated fatty alcohols having at least 12 carbon atoms and including at least 5 percent of poly-olefinically unsaturated fatty alcohols, preferably by polymerizing poly-olefinically unsaturated fatty alcohols having 16–24 carbon atoms. Unreacted monomeric fatty alcohol can be more or less completely removed after the reaction.

In a preferred embodiment of the present invention, polymeric fatty alcohols obtained by the hydrogenation of polymeric fatty acids or their esters are employed. The polymeric fatty alcohols can also be suitably obtained by the conversion of the carboxyl groups into hydroxyl groups with other reducing agents. For example, U.S. Patent 2,347,562 incorporated herein by reference teaches the production of such fatty alcohols by the catalytic hydrogenation, over copper chromite or zinc chromite, of polyene fatty acids or their esters. For example, fatty alcohols are prepared from polymers of tung oil fatty acid esters and from esters of the fatty acids of dehydrated castor oil, soya bean oil, and the like.

The polymeric polycarboxylic fatty acids or fatty acid esters can in turn be obtained by the homopolymerization of mono- and/or poly-unsaturated fatty acids or their esters or by their copolymerization with other monomers. Homopolymerization can be carried out thermally, preferably in the presence of catalysts. Polymerization processes and products of this type are disclosed in the following U.S. patents, incorporated herein by reference, for example: 2,482,761; 2,731,481; 2,793,219; 2,793,220; 2,955,121; 3,059,003; 3,076,003; 3,100,784; and 3,157,-681. In general, the polymerization preferably involves fatty acids having 10 to 22 carbon atoms derived from animal, vegetable, mineral, or synthetic sources. Homopolymeric fatty acids obtained in this manner predominantly comprise dimeric fatty acids together with portions of trimeric and monomeric fatty acids.

The preparation of polymeric fatty acids by copolymerization can take place by other methods, particularly in the presence of catalysts. U.S. Patent 3,271,432 incorporated herein by reference teaches the ionic copolymerization of fatty acids and their esters with aromatic vinyl compounds. Conjugated unsaturated fatty acids or their esters are preferred for this purpose. Styrene, α-methyl styrene, or vinyl toluene are employed as copolymerizable compounds.

In general, the radical R in Formulas I and II above, when representing a homopolymer of an unsaturated fatty alcohol or acid, will have a carbon-atom content two to four times that of the original alcohol and acid respectively which latter will usually be about 10 to 22 carbon atoms. The joinder of the alcohol or acid monomers occurs at one or more carbon to carbon bonds according to the polymerization method and the position of the bonds in the compounds. A unique structural formula for R cannot be given because mixtures of mono- and polyunsaturated monomers are usually reacted in practice, and numerous different bonded systems are formed on polymerization, including possibly even small amounts of polycyclic and/or aromatic systems. For copolymeric fatty acids or alcohols, the situation is even more complex.

Throughout the specification and claims, the term "polymeric fatty alcohols" is meant to include difunctional and polyfunctional alcohols in which two or more fatty alcohol molecules are linked directly or by bridging members, and includes chain-lengthened polyalcohols of the kind disclosed immediately below.

The polymeric fatty alcohols obtained in the manner described above can optionally be modified by reaction with alkylene oxides to obtain the hydroxy ethers of Formula II (i.e. compounds in which $a$ is other than 0).

The reaction of the polymeric fatty alcohols with epichlorohydrin is preferably carried out as a two-step reaction in which the polymeric fatty alcohols are first reacted with epichlorohydrin to form the corresponding chlorhydrins. The desired glycidyl ether is then obtained therefrom in the presence of agents cleaving hydrogen halide.

As catalysts for the reaction of the fatty alcohols with epichlorohydrin, a variety of chemical compounds are suitable. It is possible, for example, to carry out the reaction in the presence of metal halogenides, metal salts, or acids. The complex compounds of boron trifluoride have shown themselves to be particularly advantageous. Additions of less than 1 percent of boron $BF_3$-etherate, by weight of the reaction mixture, are sufficient to promote reaction between the alcohol and epichlorohydrin. The temperature in this reaction stage is suitably up to about 150° C., preferably from 20° C. to 50° C.

The cleavage of hydrogen chloride from the resulting adduct is carried out with the aid of an alkaline compound. For example, alkali hydroxides, solutions of the hydroxides in aqueous or organic solvents, ammonium carbonate, alkaline earth metal hydroxides, sodium aluminate, and the like can be employed. Concentrated alkali hydroxides are preferably employed in the cleavage, permitting temperatures up to 150° C. Advantageously this step is performed at temperatures between 30° C. and 80° C.

It should be mentioned that the adduct-forming reaction and the cleavage reaction can take place in the same vessel. In this case, unused catalyst from the first reaction is neutralized by the added alkali and does not disturb ring formation. Carrying out the two-step reaction in a single vessel is more advantageous from the point of view of cost.

It is also possible to react the fatty alcohols and epichlorohydrin in the presence of alkali in a single step reaction. However, formation of the adduct in the presence of acid catalysts and ring closure in the presence of alkaline compounds is preferred.

The aliphatic glycidyl ethers according to the invention having the Formula I above are new materials with useful properties. For example they can be admixed with suitable hardening agents to give resinous compositions useful in forming laminates, as coatings, for casting and patching materials, and as adhesives, or they can be used per se as plasticizers and stabilizers for halogen chloride cleaving agents. Conventional auxiliary agents such as pigments, fillers, and accelerators can be combined into hardenable compositions before curing.

Although the aliphatic glycidyl ethers of the present invention can be used as the exclusive polyepoxide component of curable and cured resin compositions, these materials are preferably combined with at least one other compound containing one or more epoxy groups. Compounds of this type are, for example, aliphatic, cycloaliphatic, and aromatic mono- and polyepoxides, particularly however the aliphatic, cycloaliphatic, and aromatic monoglycidyl ethers and polyglycidyl ethers such as butyl glycidyl ether, 2-ethyl-hexyl glycidyl ether, octadecanol glycidyl ether, cyclohexanol glycidyl ether, phenyl glycidyl ether, butane diol diglycidyl ether, phenylene-1,3-diglycidyl ether, phenylene-1,4-diglycidyl ether, and the various diglycidyl ethers and polyglycidyl ethers prepared by condensation of epichlorohydrin with bis(hydroxyphenyl)-propane and other bisphenol compounds, including novolaks. The basic polyepoxy resins taught in German patent publication 1,011,618 can also be employed. Also, to the extent that the easy hydrolizability of the ester groups is detrimental, glycidyl esters can be employed. The amount of the new aliphatic glycidyl ethers used in epoxy combinations of this type can be varied widely between 10 and 100 percent by weight.

Hardening agents which are suitable for use in the hardenable resin compositions of the invention include basic nitrogen-containing compounds having primary and/or secondary and/or tertiary amino groups. For example, aliphatic, cycloaliphatic, aromatic, and araliphatic polyamines such as diethylene triamine, triethylene tetraamine, tetraethylene pentamine, piperazine, aminoethyl piperazine, cyclohexyl amine, trimethyl hexamethylene diamine, N-methylpropane-diamine; N,N-butyl-propane diamine; tris(dimethylaminomethyl)-phenol; and adducts formed between polyepoxides and diamines or polyamines, as described for example in U.S. Patent 2,651,589. Condensation products containing amino groups and prepared from phenols, aldehydes, and polyamines as described in British Patent 975,702 are also suitable. Further hardening agents include polyamino amides obtained by reacting monobasic or polybasic carboxylic acids, particularly monomeric or polymeric fatty acids, with excess quantities of polyamines, particularly polyalkylene polyamines.

These cross-linking agents are generally employed in amounts containing between 0.3 and 3 equivalents of amino hydrogen atoms per epoxy group of the material to be cured. An equivalent ratio of about 1:1 is preferred, but departures are made from this ratio depending on the properties wanted in the final product.

Dicarboxylic and polycarboxylic acids and their anhydrides, such as succinic acid anhydride, phthalic acid anhydride, tetrahydrophthalic acid anhydride, and the polymeric fatty acids earlier described are also suitable hardening agents.

The acids and acid anhydrides are generally employed as cross-linking agents in amounts containing from 0.3 to 1.5 anhydride or carboxyl groups per epoxy group in the resin to be cured.

Finally, the glycidyl ethers of the invention and compositions containing them can be hardened with catalytic amounts of catalytic curing agents, for example Lewis acids such as boron trifluoride and its complexes.

From the point of view of rapid hardening, compatibility, easy working, high flexibility, and resistance, combinations of the glycidyl ethers of the present invention with aromatic monoepoxides and polyepoxides, used with condensation products of polymeric fatty acids and ether diamines as hardening agent, have proved particularly advantageous. Extraordinarily soft and extensible resins are obtained with such formulations containing large quantities of monoepoxides. These resins are free of many of the disadvantages of prior art formulations, including those attempting to achieve resin flexibility.

For example, in spite of outstanding properties such as strength, hardness, adhesive capacity, and resistance to chemicals, the aromatic glycidyl ethers, among which those comprising bisphenol A, [2,2 - bis - (4 - hydroxyphenyl)-propane], should especially be mentioned, have the disadvantage of a low flexibility and a high degree of brittleness. This limits their utility in hardened products prepared therefrom if flexibility and extensibility are demanded, particularly at low temperatures.

There have been numerous attempts to overcome these deficiencies by different means. Thus, it has been suggested in German patent publication 1,047,423 to employ mono-glycidyl ethers comprising fatty alcohols of about 16–18 carbon atoms as internal plasticizers. Also, long chain aliphatic di- and poly-glycidyl esters have been suggested for improving the flexibility of hardened epoxy resins (U.S. Patent 3,057,809). However, the addition of external plasticizers is not a satisfactory solution, since these materials are not chemically incorporated.

It is also known to choose the resin components so that they contribute to the flexibility of the hardened resin. Thus, amine hardeners prepared from long chain dicarboxylic acids and diamines have been employed for improving flexibility. However, formulations of this type are insufficient in many cases.

Processes are also known (for example in German patent publication 1,143,023) for using aliphatic diglycidyl ethers prepared from polyglycols having an average molecular weight of 200–4000 to flexibilize epoxy resins comprising aromatic glycidyl ethers. The disadvantage of such a formulation lies in its water-sensitivity.

From these previous attempts for improving the flexibility of hardened epoxy resins it is evident that a satisfactory solution of this problem has heretofore not been found. In particular, it has not heretofore been possible to prepare epoxy resins which would be flexible or softly flexible over a wide range by addition of a flexibilizing resin component, without the significant simultaneous degradation of other important properties such as resistance to hydrolysis and resistance to water absorption. These disadvantages are not observed when employing the aliphatic glycidyl ethers of the present invention.

A better understanding of the invention and of its many advantages will be had by referring to the following specific examples, given by way of illustration. In the examples, parts by weight are referred to. Mechanical properties were determined about two weeks after preparation of the castings mentioned.

EXAMPLE 1

580 parts of a polymeric fatty alcohol having a hydroxy number of 195 and a monomer and trimer content respectively of 2 and 12 percent and 1.5 parts of $BF_3$-etherate were reacted with 220 parts of epichlorohydrin added dropwise to a glass reaction vessel equipped with a stirrer, thermometer, dropping funnel, and a tube for introducing gaseous nitrogen. The reaction temperature was 40° C. After the addition of the epichlorohydrin, which took about 1½ hours, the mixture reacted at 40° C. for another 3½ hours. The hydroxy number in the reaction product had a value of 143 after this time.

Thereafter, 200 parts of a 50 percent aqueous solution of sodium hydroxide were added dropwise to the adduct at 50° C. over 1½ hours. After this time, the mixture was stirred further for about three hours and precipitated sodium chloride was separated. The glycidyl ether was washed to neutrality and water was removed under vacuum. A weakly yellow-colored product having an epoxy number of 0.23 and a viscosity of 3.1 poise at 25° C. was obtained.

EXAMPLE 2

600 parts of a polymeric fatty alcohol having a hydroxy number of 186 and a monomer and trimer content of 10 and 16 percent respectively were mixed with one part of $BF_3$-etherate, optionally with addition of a solvent, in an apparatus provided with a stirrer, vapor trap (cooled with acetone and Dry Ice), thermometer, gas outlet and dropping funnel. 440 parts of ethylene oxide were added dropwise. The ethylene oxide, which normally is gaseous, was previously condensed in a cold trap and added to the dropping funnel. The latter was equipped with a cold finger supplied with acetone and Dry Ice. The dropping funnel additionally had an outlet tube at its upper end for the removal of gaseous ethylene oxide which might possibly be evolved. The reaction began about two minutes after addition of the first drops of ethylene oxide. The temperature was held at 30°–40° C. by cooling. After 2½ hours, the alkylene oxide was completely added. The mixture was reacted for one further hour. The reaction product had an hydroxy number of 105. It was then reacted with 180 parts of epichlorohydrin in the apparatus of Example 1 in the manner there described. After the adduct was formed it was converted to the glycidyl ether with 260 parts of a 50 percent solution of sodium hydroxide. The product had an epoxy number of 0.14 and a viscosity of 5.1 poise at 25° C.

EXAMPLE 3

273 parts of a polymeric fatty alcohol having an —OH number of 205, a monomer content of 10 percent, and a trimer content of 16 percent were mixed with 0.5 part of $BF_3$ etherate (in the presence of a solvent, if desired) and were reacted with 93 parts of propylene oxide added dropwise to an apparatus equipped with a stirring apparatus, thermometer, dropping funnel, dephlegmator, and gas outlet tube. The reaction was held at 30° C.–40° C. by cooling. The propylene oxide was all added after about 45 minutes.

The reaction product, which had an —OH number of 155, was reacted with 111 parts of epichlorohydrin in the apparatus of Example 1 and in the manner there described. After formation of the adduct, it was converted to a glycidyl ether with 80 parts of a 50 percent sodium hydroxide solution. The product had an epoxy number of 0.14 and its viscosity was 6 poises at 25° C.

The superiority of the cured resins according to the present invention is evident from the following examples.

EXAMPLE 4

100 parts of the glycidyl ether of Example 1 (epoxy number 0.23) were mixed with 56 parts of a condensation product (amine number 118) prepared from (1) 26.4 parts of $\alpha,\omega$-diamino-4,11-dioxatetradecane (amine number 475), obtainable by the cyanoethylation and hydrogenation of hexane diol-1,6, and (2) 31.8 parts of commercial dimerized tall oil fatty acids having a 10 percent monomer content and 16 percent trimer content, and hardened for one hour at 120° C. A non-fusible resin having a hardness (Shore A) of 33 and an extension at break of 75 percent was obtained. The hardened resin was unchanged after boiling for 100 hours in water.

A comparative resin sample, comprising a commercial glycidyl ester of polymeric fatty acids (epoxy number 0.23) prepared according to column 3, lines 52–65 of U.S. Patent 3,057,809 instead of the glycidyl ethers of the present invention, was destroyed after about 50 hours under the same conditions.

EXAMPLE 5

100 parts of glycidyl ether like that used in Example 1 (epoxy number 0.23) and 100 parts of the commercially available diglycidyl ether of bisphenol A [2,2-bis(4-hydroxyphenyl)-propane] (epoxy number 0.52) were mixed with 96 parts of an amino amide (amine number 300) and hardened at room temperature. The amino amide was prepared by reacting 100 parts of commercial dimerized tall oil fatty acids (10 percent monomer, 16 percent trimer) with 37 parts of triethylene tetramine while stirring in 15 parts of tetraethylene pentamine. A non-fusible resin having an extension at break of 30 percent and a hardness (Shore C) of 96 was produced.

EXAMPLE 6

60 parts of the diglycidyl ether of bisphenol A (epoxy number 0.52) and 140 parts of the glycidyl ether of Example 1 (epoxy number 0.23) were hardened at room temperature with 100 parts of an amino amide (amine number 435) prepared by the reaction of 100 parts of tall oil fatty acid poor in rosin acids with 71 parts of tetraethylene pentamine. A non-fusible resin having an extension at break of 52 percent was produced. Even at −20° C., the resin showed an extensibility of 43 percent. Its hardness (Shore A) was 92 percent.

EXAMPLE 7

100 parts of the diglycidyl ether of bisphenol A (epoxy number 0.52) and 100 parts of the glycidyl ether of Example 1 (epoxy number 0.23) were hardened in the presence of 4 parts of 2,4,6-tri(dimethylaminoethyl) phenol with 168 parts of an amino amide (amine number 120) prepared by reaction of (1) 670 parts of $\alpha,\omega$-diamino-4,9-dioxadecane (amino number 532), obtainable by the cyanoethylation and hydrogenation of butanediol-1,4, and (2) 900 parts of commercial dimerized tall oil fatty acid (10 percent monomer, 16 percent trimer). A non-fusible resin having a hardness (Shore A) of 85 and an extension at break of 85 percent was obtained. Even at a temperature of −20° C., the resin has an extensibility of about 50 percent.

EXAMPLE 8

100 parts of the diglycidyl ether of bisphenol A (epoxy number 0.52) and 100 parts of the glycidyl ether of Example 2 (epoxy number 0.14) were reacted with 83 parts of the amino amide of Example 5. The mixture hardened at room temperature. The extension of the product at break was 30 percent. The hardness (Shore C) was 86.

EXAMPLE 9

50 parts of the glycidyl ether of Example 1 (epoxy number 0.23), 25 parts of the diglycidyl ether of bisphenol A (epoxy number 0.52), and 25 parts of butyl glycidyl ether (epoxy number 0.61) were mixed with 90 parts of the amino amide of Example 4 (amine number 120) in the presence of 2 parts of 2,4,6-tri(dimethyl-aminomethyl)phenol as an accelerator for hardening. A resin having a hardness (Shore A) of 29 and an extension at break of 132 percent resulted.

Although this resin was very soft, it showed an extraordinary resistance to hydrolysis.

EXAMPLE 10

50 parts by weight of the glycidyl ether of Example 1 (epoxy number 0.23), 25 parts of the diglycidyl ether of bisphenol A (epoxy number 0.52), and 25 parts of phenyl glycidyl ether (epoxy number 0.67) were mixed with 92 parts of the amino amide of Example 4 (amine number 120) in the presence of four parts of 2,4,6-tri (dimethyl-aminomethyl)phenol, and hardened at room temperature. A resin having a hardness (Shore A) of 35 and an extension at break of 140 percent was obtained.

EXAMPLE 11

67 parts of the diglycidyl ether of bisphenol A (epoxy number 0.52) and 33 parts of the glycidyl ether of Example 1 (epoxy number 0.23) were mixed with 13 parts of a commercial mixture of the 2,2,4- and 2,4,4-isomers of trimethyl-hexamethylene diamine and hardened for one hour at 120° C. The resulting resin had a hardness (Shore C) of 40, and an extension at break of 134 percent.

EXAMPLE 12

70 parts of the glycidyl ether prepared according to Example 1 (epoxy number 0.23) were mixed with 30 parts of the commercially available diglycidyl ether of bisphenol A (epoxy number 0.52) and hardened with 23 parts of phthalic acid anhydride for 15 hours at 100° C. A resin having a hardness (Shore A) of 56 and an extension at break of 85 percent was produced.

EXAMPLE 13

40 parts of a comercially available diglycidyl ether of 2,2-bis(4-hydroxy-phenyl) propane (epoxy number 0.52) were mixed with 60 parts of the glycidyl ether of Example 3 and cured at room temperature with 27.1 parts of the aminoamide of Example 6. An infusible resin was produced having a hardness (Shore A) of 79 and an extension at break of 43 percent.

EXAMPLE 14

40 parts of the diglycidyl ether of 2,2-bis(4-hydroxyphenyl) propane (epoxy number 0.52) were mixed with 60 parts of the glycidyl ether of Example 3 and hardened with 12.5 parts of trimethyl-hexamethylene-diamine at 120° C. An infusible resin was produced having a hardness (Shore A) of 79 and an extension at break of 47 percent.

The polymeric fatty alcohols used in Examples 1 and 2 were obtained as follows:

Tall oil fatty acid was polymerised according to Example 7 of DAS 1,134,666. The monomeric fatty acids were distilled off, and the residual polymeric fatty acids are hydrogenated in the presence of 5% copper chromium oxide at 200° C. and 300 at hydrogen pressure.

In a similar way the polymeric fatty alcohol as used in Example 3 was obtained with the only exception, that it was worked in conformity with Example 8 of DAS 1,134,666 and soya oil fatty acid was used.

What is claimed is:

1. A hardenable composition comprising at least 10 percent by weight of an aliphatic glycidyl ether of the formula

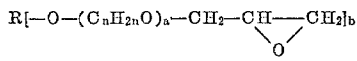

wherein R is the hydrocarbon radical of a polymeric fatty alcohol and wherein $a$ is 0 to 5, $b$ is 2 to 4, and $n$ is 2 or 3, in combination with at least one other 1,2-epoxy compound.

2. A composition as in claim 1 wherein said epoxy compound includes a glycidyl ether selected from the group consisting of aliphatic, cycloaliphatic, and aromatic monoglycidyl ethers and polyglycidyl ethers.

3. A resinous material prepared by curing the hardenable composition of claim 1 by admixing therewith a member selected from the group consisting of polyamines and polyaminoamides in an amount providing between 0.3 and 3 equivalents of amino hydrogen atoms per epoxy group of said composition, polycarboxylic acids in an amount providing 0.3 to 1.5 carboxy groups per epoxy group in said composition, polycarboxylic acid anhydrides in an amount providing 0.3 to 1.5 anhydride groups per epoxy group in said composition, and Lewis acids in a catalytic amount.

4. A resinous material prepared by curing an aliphatic glycidyl ether of the formula

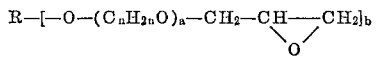

by admixing therewith a member selected from the group consisting of polyamines and polyaminoamides in an amount providing between 0.3 and 3 equivalents of amino hydrogen atoms per epoxy group of said glycidyl ether, polycarboxylic acids in an amount providing 0.3 to 1.5 carboxy groups per epoxy group in said glycidyl ether, polycarboxylic acid anhydrides in an amount providing 0.3 to 1.5 anhydride groups per epoxy group in said glycidyl ether, and Lewis acids in a catalytic amount.

References Cited

UNITED STATES PATENTS 3,147,286  9/1964  Leumann et al.

WILLIAM H. SHORT, Primary Examiner

T. PERTILLA, Assistant Examiner

U.S. Cl. X.R.

260—47, 78.4, 830